July 4, 1950

C. PERRY 2,513,671

SAW FILING DEVICE

Filed Nov. 8, 1949

INVENTOR.
Clarence Perry
BY
Hedman B Hoar
Agent

July 4, 1950   C. PERRY   2,513,671
SAW FILING DEVICE
Filed Nov. 8, 1949   2 Sheets-Sheet 2
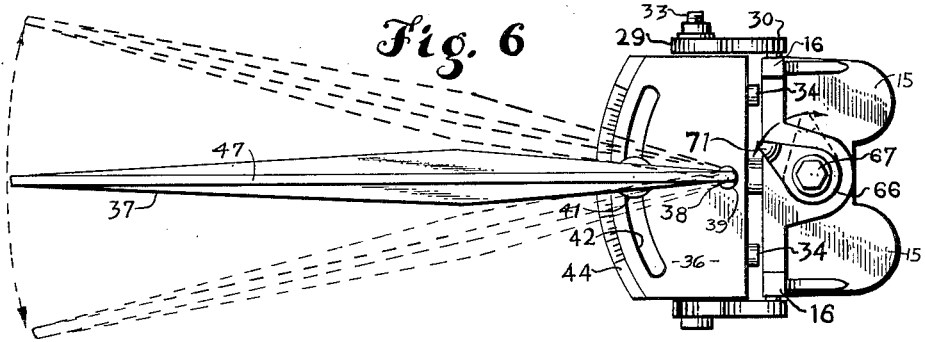
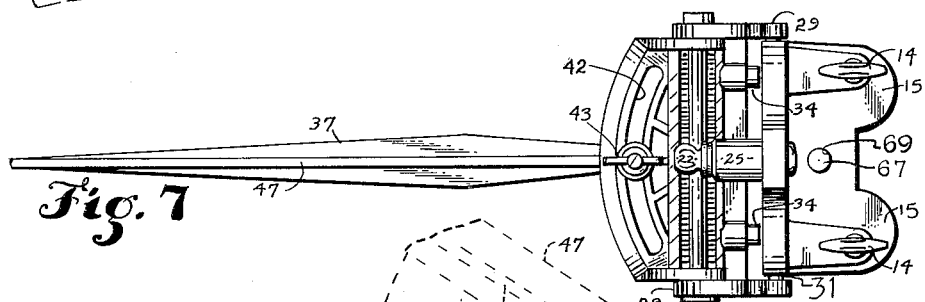
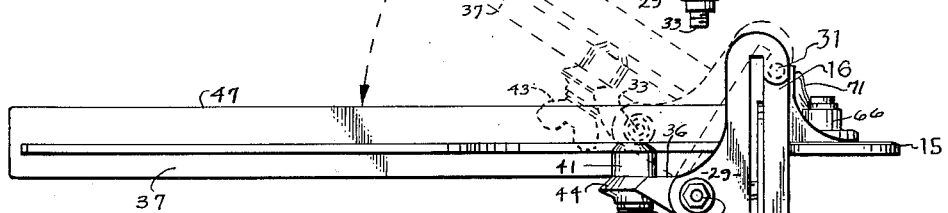
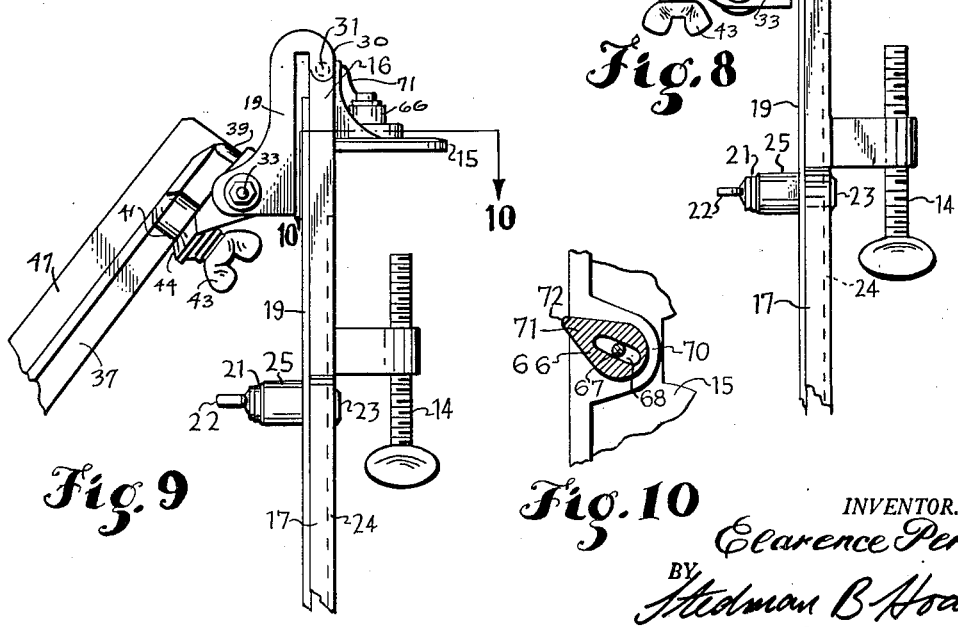
INVENTOR.
Clarence Perry
BY Stedman B Hoar
Agent Patented July 4, 1950

2,513,671

UNITED STATES PATENT OFFICE 2,513,671

SAW FILING DEVICE

Clarence Perry, Santa Ana, Calif.

Application November 8, 1949, Serial No. 126,127

3 Claims. (Cl. 76—31)

This invention relates in general to tool-holders and guides, and more particularly relates to a device for holding and guiding a file in the operation of making or sharpening a saw. Reference is made to my Patent No. 2,460,189, issued January 25, 1949, for a saw-file holder and guide, the present invention being an improvement on the device disclosed in said patent in that it requires no special type of saw-table support for its operation and application, but may be set up on an ordinary table or work-bench and may be used with equal effectiveness to dress either straight or circular saws.

While the above-mentioned characteristic of my present invention may be stated as a principal object thereof, a further object of the invention is to provide a filing device which holds the saw-blade as well as the file to be applied thereto, and in such a manner that momentary release of pressure upon the file releases the saw-blade for movement to a new position, thus permitting rapid application of the file to any series of saw-teeth requiring like treatment.

Still another object of the invention is to provide a file guide capable of holding files of various shapes and of applying such files in a wide range of planes and angles by convenient and simple adjustment mechanism, whereby time may be saved in adjusting the device for filing teeth requiring diverse treatments.

Yet another object of the invention is to provide a saw filing device in which a saw may be held in a manner effective for setting the saw teeth and may be rapidly moved to permit accurate setting of one tooth after another.

In terms of broad inclusion, I have accomplished the foregoing objects and purposes of my invention by embodying therein saw-clamping mechanism having one clamping arm adapted to be secured to the edge of a bench or table and a second clamping arm, pivoted on the first-mentioned arm, arranged to fall by gravity thereagainst so that the arms may hold a saw blade between them, the first-mentioned arm including adjustable means for holding blades of diverse radius or width at the proper relative elevation. A file-holder track is mounted on the second, or pivoted arm by universal joint means so as to be pivotable independently of said second arm and so as to be clamped in any position permitted by the joint. A file-holder carrier is manually reciprocable on the track, and may consequently approach at any desired angle a saw blade clamped between the arms, the track at the same time serving as a lever to enhance the clamping force upon the blade. A file-holder, adapted to hold either flat or three-cornered files, is swively held in the carrier, permitting any surface of the file to be brought to bear upon the saw-teeth. The carrier is arranged to have a certain normal guided relationship to the track, for the benefit of unskilled operators, but also to be rockable on the track so that the inclination of the file may be varied by a skilled operator without resort to the clamped adjustments. Means are also provided for backing the saw-blade to dampen vibration during the filing process, which are suitably arranged and formed for backing the saw-blade during the process of setting the teeth.

The invention possesses other advantages and useful purposes which will become apparent from consideration of the following more specific description of a preferred embodiment of the invention, taken in conjunction with the accompanying drawings illustrative of that embodiment, in which:

Figure 6 is a top plan view of the saw clamp and file carrier track of my device, the file carrier being removed;

Figure 7 is a view from below of the mechanism shown in Figure 6;

Figure 8 is a side elevational view of the mechanism shown in Figure 6, illustrating the pivotal action of the clamping mechanism;

Figure 9 is a fragmentary view similar to Figure 7, illustrating vertical pivotal movement of the file holder track independent of movement of the clamping mechanism; and Figure 10 is a horizontal sectional view, on the plane of section indicated by the line 10—10 of Figure 9, showing the adjustable action of the backing means.

Figure 1:
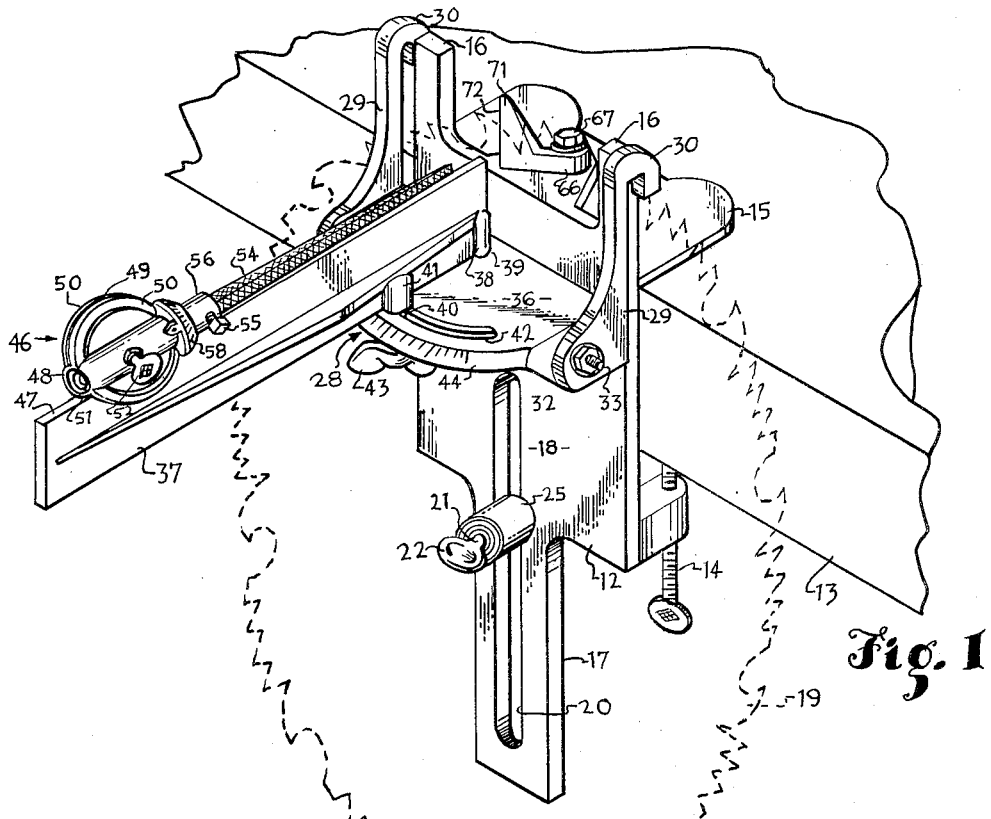
Figure 1 is a perspective view of my improved saw filing device, showing it attached to a work bench and holding a circular-type saw in position for filing.
Figure 2:
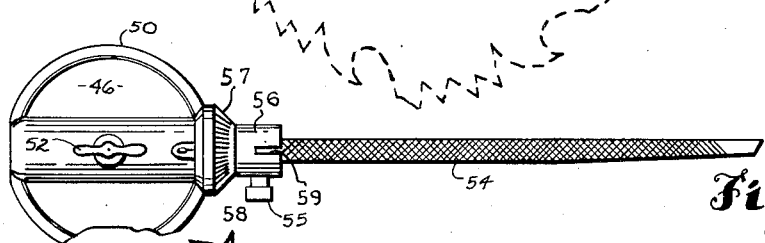
Figure 2 is a side elevational view of the file carrier portion of my device.
Figure 3:
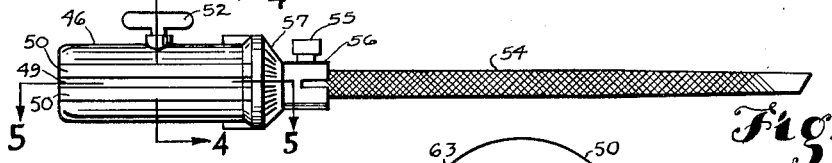
Figure 3 is a plan view of the file carrier.
Figure 4:
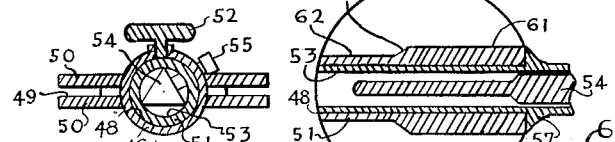
Figure 4 is a transverse sectional view taken on the plane of section indicated by the line 4—4 of Figure 3.

Having reference now to the details of the drawings, I have shown in Figure 1 a saw filing device embodying the principles of my invention in which the device has a stationary bracket 12 which may be secured to the edge of a table or bench 13 by screw clamps 14 and plate 15. Bracket arms 16, at the sides of the bracket body 12, extend upwardly above the plate 15 and an arm 17 extends downwardly, to form with the face of the bracket body 12 a flat surface 18 against which a saw-blade 19 may be pressed. The downwardly extending arm 17 has a vertical slot 20 in which a bolt 21 is slidable. The bolt 21 has a wing-head 22 by which it may easily be turned in a nut 23 guided in a recess 24 on the rearward side of the arm 17, and supports a sleeve 25 which may be clamped by the bolt at desired elevations along the slot 20. The sleeve 25 may be selected of suitable diameter to fit the shaft-hole of a circular saw, and it, or its equivalent, may also be used to support a straight saw by the back edge thereof.

A second bracket 28 is pivotally mounted on the bracket 12 so as to be capable of clamping a saw-blade against the surface 18. The bracket 28 is preferably, for reasons hereinafter set forth, not a unit, but comprises side arms 29 having hooked upper ends 30 provided with hinge pins 31, and a cross-member 32 secured to the arms 29 by a bolt 33 and having pivotal action upon the horizontal axis provided by the bolt 33 when the latter is loosened. Plugs 34, of leather or other suitable material, are inserted in suitable holes in the face of the cross-member 32 adjacent the surface 18, to provide raised friction surfaces engageable with the side of the saw-blade 19. The hooked ends 30 of the arms 29 permit the bracket 28 to hang by gravity slightly spaced from the bracket 12, with the plugs 34 extending across the intervening space to impose a light frictional resistance to movement of the blade 19. The brackets 12 and 28 thereby cooperate as gravitationally-operated clamping arms, but, as will be seen, subject to application of much greater clamping force.

The cross-member 32 has a broad upper surface 36 upon which a lever 37 is pivotally mounted. The lever 37 has a pivot pin 38 at its proximal end, engageable in a hole 39 in the cross-member 32, and has a screw 40 set in a boss 41 and slidingly engageable in an arcuate slot 42 in the cross-member 32. A wing-nut 43 on the screw 40, below the cross-member 32, serves to clamp the lever 37 in selected angular relationship to the saw-blade 19 in the plane of the surface 36 as shown in Figure 6, the relationship being indicated by a scale 44 on the margin of the cross-member 32; and the plane of the surface 36 may be altered in angular relation to the blade by tilting the bracket 28 upon the hinge pins 31, as shown in Figure 8, or by tilting the cross-member 32 upon the hinge-bolt 33 as shown in Figure 9. It will be obvious that a very considerable clamping force may be exerted upon the blade 19 by the application of downward pressure upon the lever 37.

The lever 37 serves also as a track for a file-carrier 46, having a ridge or rail 47 extending lengthwise on its upper side. The file-carrier 46 has preferably the form of a flat circular disk, so as to be conveniently grasped for manual operation, and has a diametrically extending bore 48. On each side of the bore 48, but not so deep as to communicate therewith, the file-carrier 46 has circumferential grooves 49, each providing spaced flanges 50 to straddle the rail 47 and to guide the file carrier in reciprocating movement along the rail. The bore 48 holds a cylindrical file-holder 51 which may be retained in selected rotary orientation by a set-screw 52. The file-holder 51 in turn has a bore 53 adapted to receive a file 54, the file being held firmly in the bore 53 by a set-screw 55. As herein illustrated, the file 54 is a triangular file, but a square file may obviously be held in the bore 53 with equal facility. One end 56 of the file holder 51 extends outwardly from the bore 48 and has an annular flange 57 which engages with the outer shoulder of the bore 48, and carries an angular scale 58 indicative of the rotary orientation of the file-holder. To accommodate a flat file, the end 56 has a transverse slot 59 in which the blade of a flat file may be fitted, the shank of the file then extending into the bore 53 and being engaged by the set-screw 55.

Figure 5:
Figure 5 is a sectional view on the plane of section indicated by the line 5—5 of Figure 3, showing rocker slides on which the file-carrier moves.

As shown in Figure 5, the bottom or web surfaces of the grooves 49 are not straight, the grooves being of shallower depth toward that side of the file-carrier 46 from which the file-holder 51 protrudes and there providing slide surfaces 61 parallel to the axis of the bore 48 and spaced relatively widely from the bore, as compared to slide surfaces 62 at the deeper end of the grooves. The shoulders 63 at the interior ends of the slide surfaces 61 are rounded and provide rocker surfaces on which the file carrier may be rocked upon the rail 47. It will be observed that the file-carrier 46 is symmetrical in its arrangement, permitting it to ride the rail 47 with either groove 49 uppermost, and the angle of attack of a three-cornered file may thus be changed 120° by simply turning the file-carrier over, without changing the orientation of the file-holder 51 relatively to the bore 48. Opposite sides of a flat file may be used successively without pausing to clean filing therefrom.

A backing block 66 is mounted upon the plate 15, serving the double purpose of dampening vibration in a saw-blade while the latter is being filed, and of providing a resistance against which a saw-blade may be hammered during the process of setting the teeth. The block 66 is pivotally secured to the plate 15 by a bolt 67 operating in a slot 68 in the block and engaging a threaded hole 69 in the plate which may have a boss 70 to provide depth for the hole. One end of the block 66 has a raised triangular boss or fin 71, providing the block with a forward edge 72. The hole 69 and the hole 39 in which the track lever 37 pivots are on an alignment normal to the plane in which the saw-blade 19 is clamped, and the slot 68 permits the block to be clamped with the forward edge 72 at a moderate distance from this alignment and on either side thereof and in contact with the saw-blade.

When a saw is to be filed or set, the blade 19 is supported on the vertically adjustable sleeve 25 with its teeth approximately in the vertical range of the fin 71. If the operation is one of filing, the file track may be set at suitable vertical and horizontal angles by adjustment of the inclination of the cross-member 32 and by adjustment of the pivotal setting of the lever 37 upon the cross-member 32. The angle of attack of the file surface is adjusted by suitable orientation of the file holder 51 in the carrier 46. The file will then follow truly upon the course so set when the carrier is manually reciprocated upon the rail 47. Accurate filing may be achieved by sliding the file upon the raised slide surfaces 61, and if it is desired to file in only one direction the file may be lifted from the saw-teeth by rocking the carrier on the rocker-shoulder 63. An expert will also find the rocker shoulder 63 useful in making slight changes in the path of the file without changing the inclination of the cross-member 32.

During the above-described filing operation, the saw-blade may be rapidly unclamped for advancement to another tooth by simply raising the lever 37. Downward pressure upon the lever 37 firmly holds the saw-blade in place while the file is being reciprocated.

During a tooth-setting operation the carrier 46 and the file may be lifted from the rail 47, and the side of the lever 37 may be used to guide the stroke of a suitable setting hammer. The lever will be raised and lowered as above described to permit advancement of the saw blade as the teeth are set.

It will be understood that the foregoing description and the illustrations herewith are to be taken as examples of my invention and that various changes in arrangement and construction of the several parts of my improved saw filing device may be made without departure from the scope and spirit of my invention as set forth in the appended claims.

I claim:

1. In a saw filing device: cooperating clamping arms pivotally joined and adapted to grasp a saw blade; track means pivotally carried by one of said arms so as to be directable at diverse angles to said blade and at a specific zone with respect to said arms; a file carrier adapted for reciprocating movement along said track means; a backing block carried by the other of said arms adjacent said specific zone; and slot and stud means pivotally connecting said backing block to said other arm whereby said backing block may be moved into contact with said blade at positions in a zone substantially coextensive with said specific zone and on the side of said blade opposite to the side at which said track is directed.

2. In a saw filing device, in combination with a track for guiding a file-carrier and a file carried thereby towards and away from a saw blade; a manually operated file carrier having a bore, and spaced walls parallel to said bore for engaging the sides of said track, and slide surfaces between said walls for engaging the face of said track, said slide surfaces having portions spaced relatively widely from the axis of said bore and other portions spaced more closely to said axis and rocker surfaces conecting said widely spaced and said closely spaced portions whereby said carrier may be held at a fixed inclination to said track or may be rocked thereon; and means for retaining a file rigidly in said bore.

3. In a saw-filing device: a bracket having upwardly extending arms; means on said bracket for supporting a saw-blade; arms pivotally depending from the upper ends of the arms of said bracket; a cross-member pivotally mounted between said depending arms, said cross-member and said depending arms being arranged as a unit to engage said blade in opposition to said bracket; a lever extending outwardly from said cross-member and operative by downward pressure to clamp said blade between said bracket and the unit formed by said depending arms and said cross-member; track means extending lengthwise of said lever; a file-carrier engageable on said track means for reciprocating movement thereon; and means for clamping said cross-member in relation to said depending arms so as to secure said track means at selected angles of inclination toward said blade.

CLARENCE PERRY.

REFERENCES CITED

The following references are of record in the file of this patent:

UNITED STATES PATENTS

| Number | Name | Date |
| --- | --- | --- |
| 202,309 | Wagner | Apr. 9, 1878 |
| 267,756 | Palm | Nov. 21, 1882 |
| 455,727 | Morrison | July 7, 1891 |
| 2,482,694 | Shearer | Sept. 20, 1949 |